US011627701B2

(12) United States Patent
White et al.

(10) Patent No.: US 11,627,701 B2
(45) Date of Patent: Apr. 18, 2023

(54) AGRICULTURAL HEADER WITH FLEXIBLE JOINT

(71) Applicant: DEERE & COMPANY, Moline, IL (US)

(72) Inventors: Matthew R. White, Geneseo, IL (US); Bryan R. Yanke, Eldridge, IA (US); Duane M. Bomleny, Geneseo, IL (US); Corwin M. Puryk, Bettendorf, IA (US); Joshua R. Pierson, East Moline, IL (US); Anthony J. Washburn, Orion, IL (US); Shane Anderson, Syracuse, UT (US)

(73) Assignee: DEERE & COMPANY, Moline, IL (US)

( * ) Notice: Subject to any disclaimer, the term of this patent is extended or adjusted under 35 U.S.C. 154(b) by 432 days.

(21) Appl. No.: 16/859,231

(22) Filed: Apr. 27, 2020

(65) Prior Publication Data
US 2021/0127579 A1    May 6, 2021

Related U.S. Application Data

(60) Provisional application No. 62/928,581, filed on Oct. 31, 2019.

(51) Int. Cl.
*A01D 67/00* (2006.01)
*A01D 61/00* (2006.01)
(Continued)

(52) U.S. Cl.
CPC ......... *A01D 67/005* (2013.01); *A01D 61/002* (2013.01); *A01D 61/008* (2013.01);
(Continued)

(58) Field of Classification Search
CPC .. A01D 67/005; A01D 61/002; A01D 61/008; A01D 61/02; A01D 67/00;
(Continued)

(56) References Cited

U.S. PATENT DOCUMENTS

| 4,232,747 | A  | * | 11/1980 | Pfenninger | .......... | A01B 73/044 |
|---|---|---|---|---|---|---|
|   |   |   |   |   |   | 172/311 |
| 7,926,248 | B2 | * | 4/2011 | Schmidt | ................. | A01D 41/14 |
|   |   |   |   |   |   | 56/181 |

(Continued)

FOREIGN PATENT DOCUMENTS

| EP | 2420129 B1 | 1/2016 |
|---|---|---|
| EP | 3446558 B1 | 4/2020 |

(Continued)

*Primary Examiner* — Arpad F Kovacs
(74) *Attorney, Agent, or Firm* — Klintworth & Rozenblat IP LLP

(57) ABSTRACT

An agricultural header for use with an agricultural harvester is configured to cut crop when the agricultural harvester moves in a direction of travel. The agricultural header comprises a first frame, a side draper belt supported by the first frame and positioned to receive cut crop and advance cut crop laterally relative to the direction of travel, a second frame, a center draper belt supported by the second frame and positioned in register with the side draper belt to receive cut crop laterally therefrom and advance cut crop rearwardly toward the agricultural harvester opposite to the direction of travel, and a joint interconnecting the first frame and the second frame and enabling relative fore-aft and lateral translation between the first frame and the second frame.

11 Claims, 11 Drawing Sheets

(51) Int. Cl.
*A01D 61/02* (2006.01)
*F16J 15/3284* (2016.01)
*A01D 47/00* (2006.01)
*A01D 34/14* (2006.01)

(52) U.S. Cl.
CPC ............. *A01D 61/02* (2013.01); *A01D 67/00* (2013.01); *F16J 15/3284* (2013.01); *A01D 34/14* (2013.01); *A01D 47/00* (2013.01)

(58) Field of Classification Search
CPC ...... A01D 34/14; A01D 47/00; A01D 41/144; F16J 15/3284
See application file for complete search history.

(56) References Cited

U.S. PATENT DOCUMENTS

| | | | |
|---|---|---|---|
| 7,992,372 B1* | 8/2011 | Goers | A01D 41/14 56/153 |
| 8,087,224 B1* | 1/2012 | Goers | A01D 57/20 56/153 |
| 9,402,343 B1* | 8/2016 | Allochis | A01D 34/283 |
| 10,433,483 B2 | 10/2019 | Cook | |
| 10,433,486 B2* | 10/2019 | Vandeven | A01D 41/144 |
| 2007/0251202 A1 | 11/2007 | Coers et al. | |
| 2010/0011729 A1* | 1/2010 | Salley | A01D 41/16 29/464 |
| 2013/0097986 A1* | 4/2013 | Lovett | A01D 41/14 56/153 |
| 2019/0000014 A1* | 1/2019 | Farley | A01D 41/144 |
| 2019/0000015 A1* | 1/2019 | Lauwers | A01D 41/14 |

FOREIGN PATENT DOCUMENTS

| | | | | |
|---|---|---|---|---|
| EP | 3469877 B1 * | 6/2021 | ............. | A01D 34/04 |
| WO | WO2009136274 A1 | 11/2009 | | |
| WO | WO19055521 A1 | 3/2019 | | |

* cited by examiner

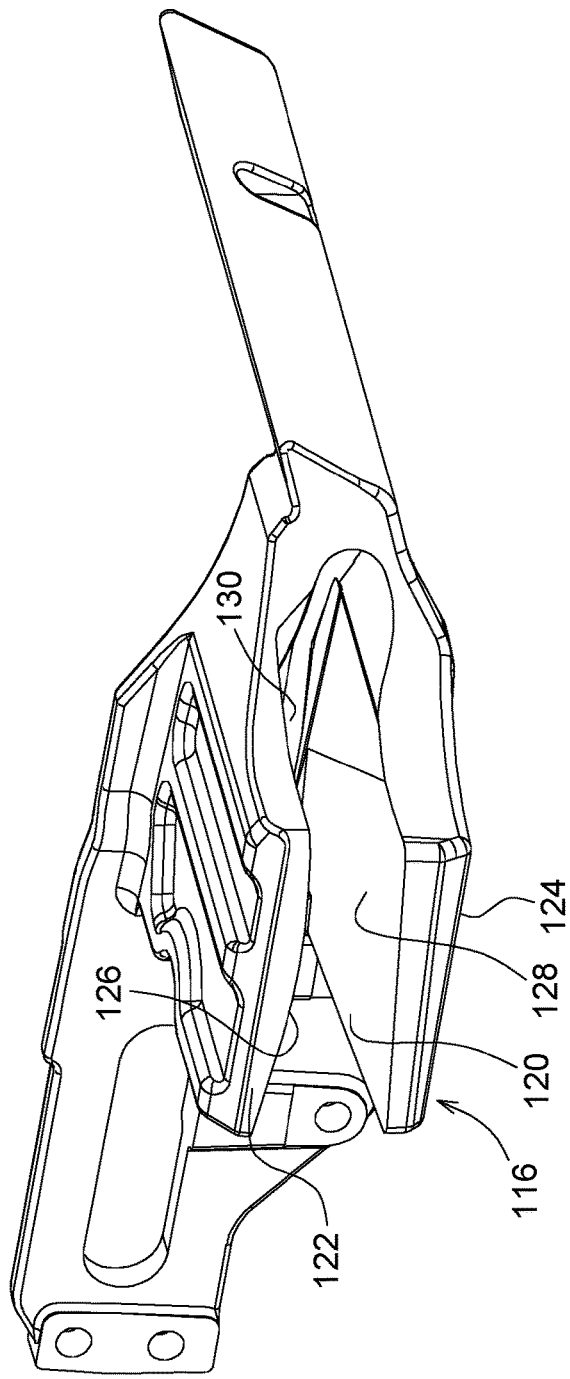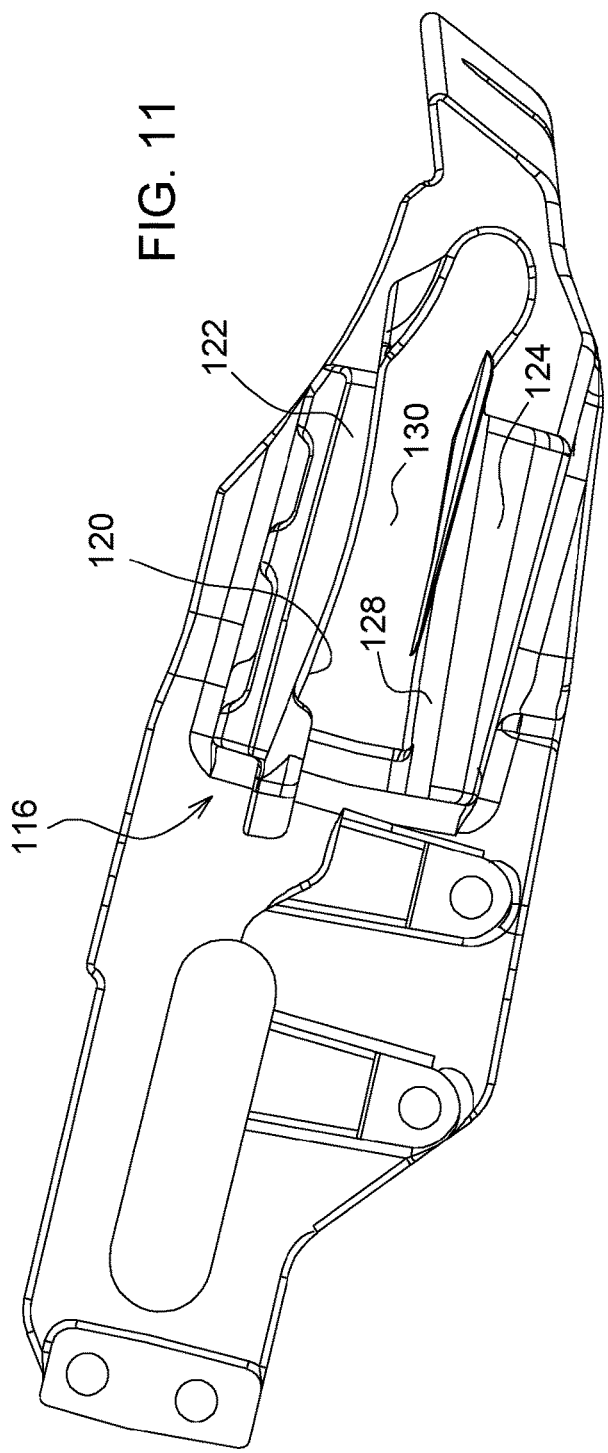

US 11,627,701 B2

AGRICULTURAL HEADER WITH FLEXIBLE JOINT

FIELD OF THE DISCLOSURE

The present disclosure relates to an agricultural header for use with an agricultural harvester.

BACKGROUND OF THE DISCLOSURE

Agricultural headers are used with agricultural harvesters to harvest a crop. In one type of agricultural header, the agricultural header has two side draper belts and a center draper belt positioned laterally between the side draper belts relative to the direction of travel of the agricultural harvester and header. The belts receive crop cut by a cutter bar ahead of the belts relative to the direction of travel. The side draper belts convey crop laterally toward the center draper belt. The center draper belt receives cut crop from the side draper belts and convey cut crop rearwardly toward the feederhouse of the agricultural harvester opposite to the direction of travel.

SUMMARY OF THE DISCLOSURE

According to an aspect of the present disclosure, there is disclosed an agricultural header for use with an agricultural harvester. The agricultural header is configured to cut crop when the agricultural harvester moves in a direction of travel. The agricultural header comprises a first frame, a side draper belt supported by the first frame and positioned to receive cut crop and advance cut crop laterally relative to the direction of travel, a second frame, a center draper belt supported by the second frame and positioned in register with the side draper belt to receive cut crop laterally therefrom and advance cut crop rearwardly toward the agricultural harvester opposite to the direction of travel, and a joint interconnecting the first frame and the second frame and enabling relative fore-aft and lateral translation between the first frame and the second frame.

According to another aspect of the present disclosure, an agricultural header for use with an agricultural harvester is configured to cut crop when the agricultural harvester moves in a direction of travel. The agricultural header comprises a side frame, a side draper belt supported by the side frame and positioned to receive crop cut by the agricultural header and advance cut crop laterally relative to the direction of travel, a center main frame to which the side frame is coupled for movement relative to the center main frame, a center belt frame, a center draper belt supported by the center belt frame and positioned in register with the side draper belt to receive cut crop laterally therefrom and advance cut crop rearwardly toward the agricultural harvester opposite to the direction of travel, and a joint coupled to the center main frame and the center belt frame enabling relative fore-aft and lateral translation between the center main frame and the center belt frame.

The above and other features will become apparent from the following description and accompanying drawings.

BRIEF DESCRIPTION OF THE DRAWINGS

The detailed description of the drawings refers to the accompanying figures in which:

FIG. 10 is a perspective view showing a clevis of the joint integrated with a component of the center belt frame;

FIG. 11 is a side elevational view showing the clevis; and

DETAILED DESCRIPTION OF THE DRAWINGS

Figure 1:
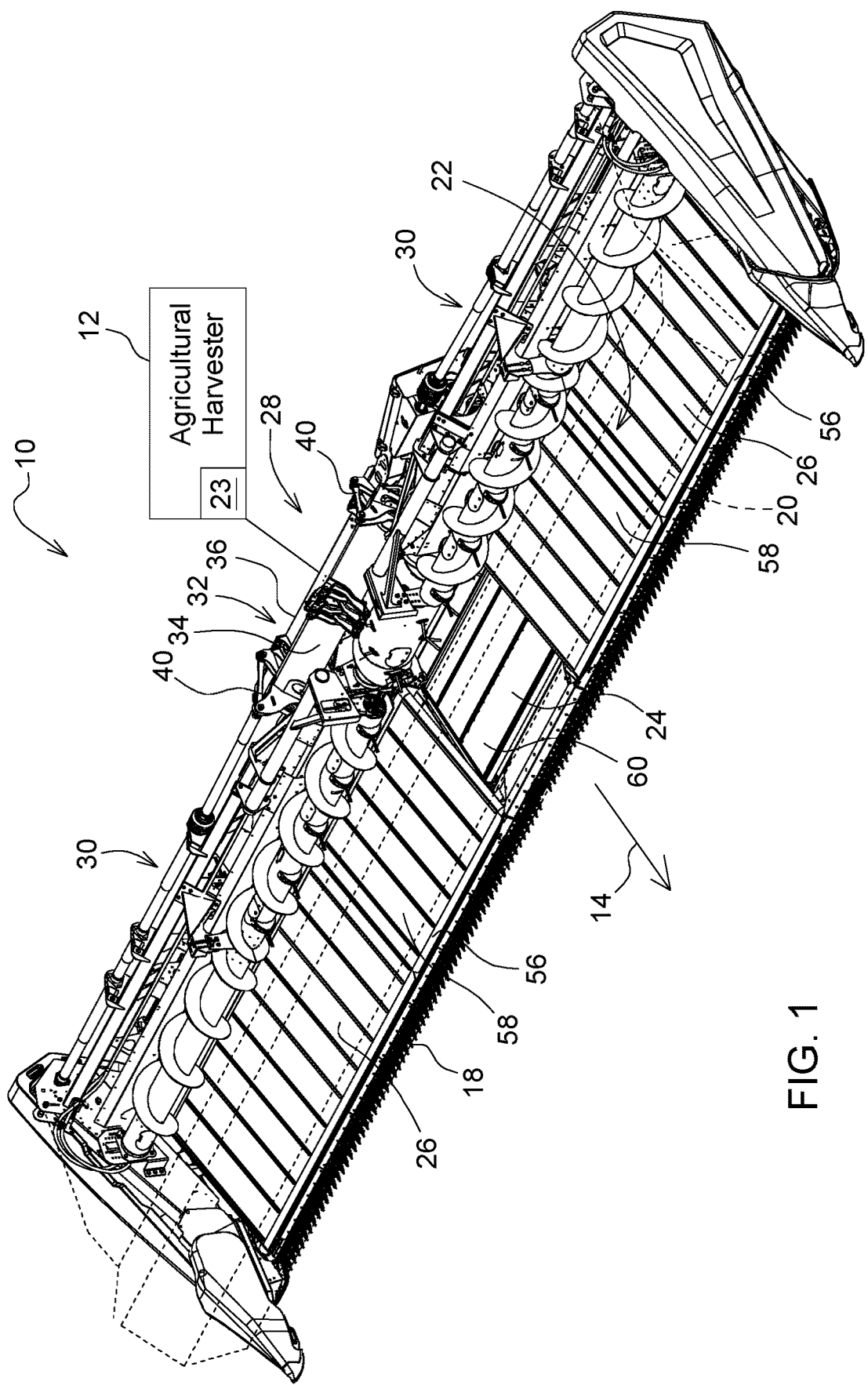
FIG. 1 is a perspective view showing an agricultural header having a center draper belt and two side draper belts that convey cut crop laterally relative to a direction of travel toward the center draper belt for transport to the feederhouse of an agricultural harvester (shown diagrammatically)
Figure 2:
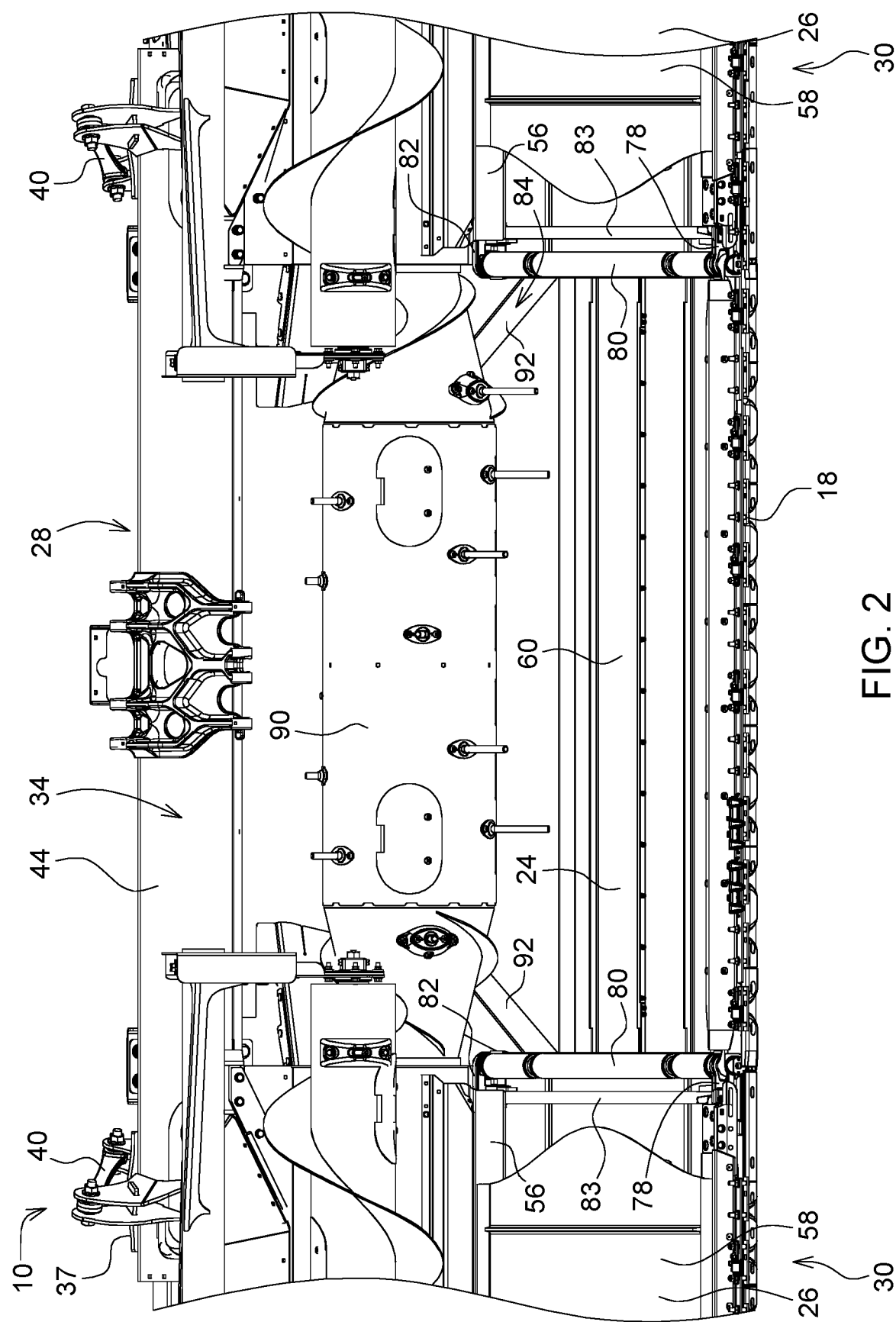
FIG. 2 is a front elevational view, with portions broken away, showing the agricultural header.
Figure 3:
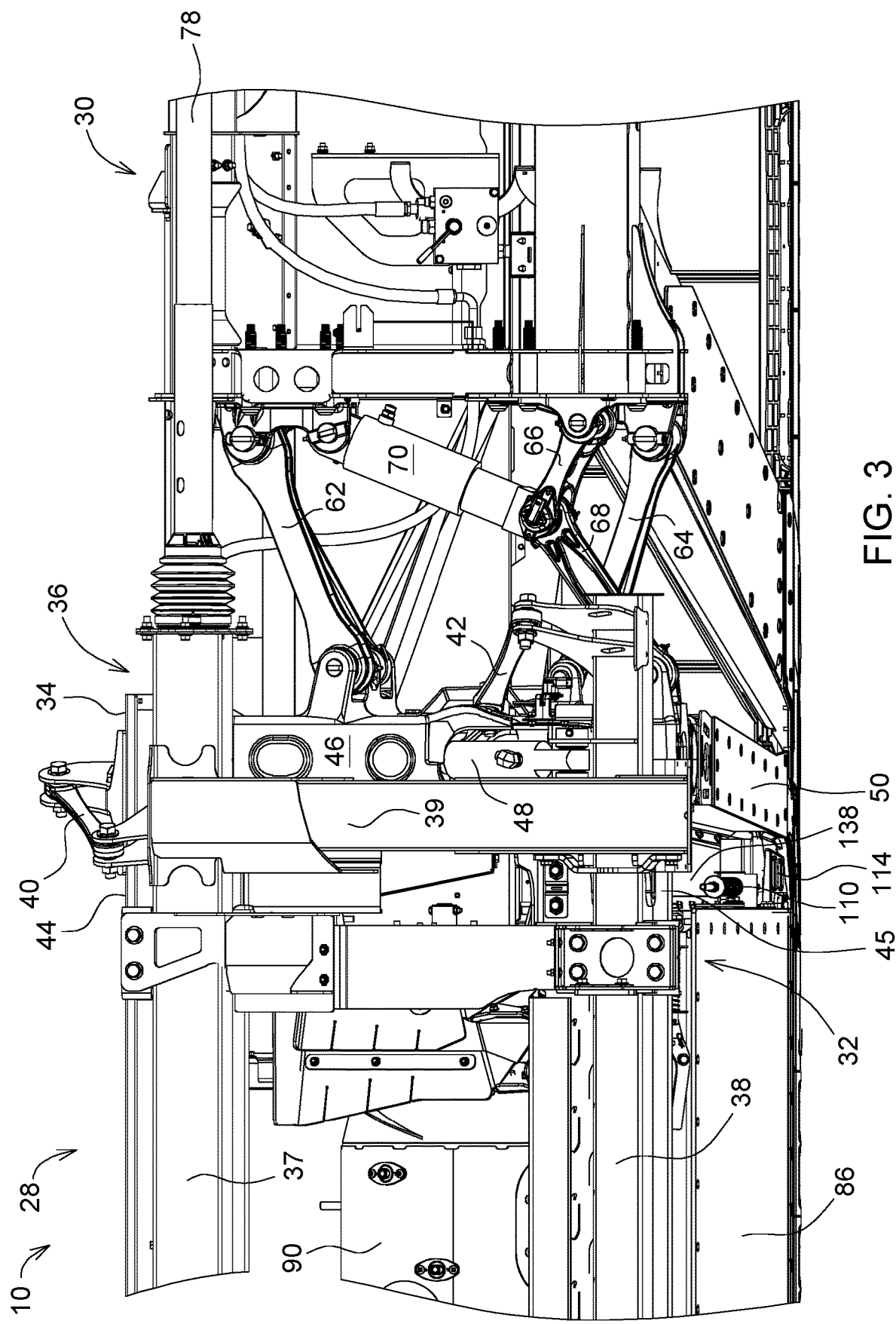
FIG. 3 is a rear elevational view showing coupling of a side section of the agricultural header to a center section of the header, and showing coupling of a center main frame of the center section to an attachment frame.

Referring to FIGS. 1-3, an agricultural header 10 is provided for use with an agricultural harvester 12 shown diagramatically (e.g., a combine harvester). The agricultural header 10 is configured to cut crop when the agricultural harvester 12 moves in a direction of travel 14 over a field. The agricultural header 10 has a pair of joints 114 positioned to enable translation between frames of the header 10 to promote terrain-following of the header 10, as discussed herein.

The header 10 includes a cutter bar 18 extending laterally relative to the direction of travel 14 and configured to cut crop. The cutter bar 18 has a reciprocating knife that severs the stalk of the crop. A reel 20 of the header 10 moves the cut crop rearwardly, opposite to the direction of travel 14, onto a conveyor system 22 of the header 10 behind the cutter bar 18.

The conveyor system 22 transports the cut crop to a feederhouse 23 of the harvester 12 (feederhouse 23 shown diagrammatically) for intake into the harvester 12 and processing thereby. The conveyor system 22 includes a center conveyor 24 and two side conveyors 26. Each of the conveyors 24, 26 receives cut crop directly from the cutter bar 18. The side conveyors 24 transport the cut crop laterally inwardly to the center conveyor 26. The center conveyor 26 receives cut crop from the side conveyors 24, and transports cut crop received from the side conveyors and from the cutter bar 18 rearwardly to the feederhouse 23 for intake into the harvester 12.

The header 10 includes a center section 28 and two side sections 30 (left and right) positioned on and coupled to laterally opposite sides of the center section 28. The center section 28 includes the center conveyor 24, and each side section 30 includes a respective one of the side conveyors 24. The description herein of one side section 30 applies to the other side section 30.

The center section 24 is supported by and in communication with the feederhouse 23. The center section 24 includes a center support frame 32 coupled to the feederhouse 23 and a center main frame 34 coupled to the center support frame 32 for movement relative thereto. The center support frame 32 includes an attachment frame 36 coupled to the feederhouse 23 in fixed relation thereto.

The center main frame 34 is coupled to the attachment frame 36 via a four-bar linkage of the header 10 for movement relative to the attachment frame 36 in response to changes in the terrain. The four-bar linkage includes two upper links 40, which are similar to one another, and two lower links 42, which are similar to one another (left lower link 42 not shown). The upper and lower links 40, 42 are coupled to the center main frame 34 and the attachment frame 36 so as to interconnect the frames 34, 36. The center main frame 34 includes an upper lateral member 44, a lower lateral member 45, a first (right) upright side member 46, and a second (left) upright side member 46, the upper and lower lateral members 44, 45 coupled fixedly (e.g., welded) to the upright side members 46. The attachment frame 36 includes an upper lateral member 37, a lower lateral member 38, a first (right) upright side member 39, and a second (left) upright side member 39 (not shown but similar to first upright side member 39), the upper and lower lateral members coupled fixedly (e.g., welded) to the upright side members. The upper links 40 are coupled pivotally to the upper lateral members 37, 44 of the attachment frame 36 and the center main frame 34. The lower links 42 are coupled pivotally to the lower lateral member 38 of the attachment frame 36 and coupled pivotally respectively to the first and second upright side members 46 of the center main frame 34. The center main frame 34 is an example of a first frame of the agricultural header 10.

The center main frame 34 is coupled to the attachment frame 36 via a first (right) and a second (left) hydraulic cylinder 48 of the header 10, which are similar to one another (second hydraulic cylinder 48 not shown) (FIG. 3). Pressure in the two cylinders 48 is regulated to establish a desired terrain-following capacity. The first cylinder 48 is coupled pivotally to the lower lateral member 38 of the attachment frame 36 and the first upright side member 46 of the center main frame 34, and the second cylinder 48 is coupled pivotally to the lower lateral member 38 of the attachment frame 36 and the second upright side member 46 of the center main frame 34.

Each side section 30 has a side frame 56 and a side conveyor 26 supported by the side frame 56. The cutter bar 18 is coupled to the side frame 56 of each side section 30. The side conveyor 26 includes a side draper belt 58 supported by the side frame 56. The side draper belt 58 is positioned behind the cutter bar 18 relative to the direction of travel 14 to receive cut crop therefrom and is arranged to advance cut crop laterally relative to the direction of travel 14 to the center section 24. A center draper belt 60 of the center conveyor 24 is positioned in register with the side draper belt 58 to receive cut crop laterally therefrom and advance cut crop rearwardly toward the harvester 12 opposite to the direction of travel 14. Each belt 58, 60 forms a closed loop. Each of the center draper belt 60 and side draper belts 58 may include texture elements (not shown) on its surface between adjacent cleats (shown) to hinder fore-aft movement of crop material on the surface.

Referring to FIG. 2, the side conveyor 26 includes a number of rollers supported by the side frame 56 and spaced laterally apart from one another and about which the side draper belt 34 is entrained. The rollers include a proximal roller, a distal roller, and a number of rollers therebetween. The proximal roller, shown at 80 (FIG. 2), is positioned adjacent to the center section 24 and is the laterally innermost roller of the rollers of the side conveyor 32. The distal roller is the laterally outermost roller of the rollers of the side conveyor 32. A motor of the side conveyor 32 drives the distal roller in rotation to circulate the side draper belt 34 in a closed-loop path about the rollers of the side conveyor 32.

Referring to FIG. 3, the side frame 56 may be coupled to the center main frame 34 in a wide variety of ways. For example, each side frame 56 is coupled to the center main frame 34 with a set of links for movement relative thereto. The set includes an upper link 62 and a lower link 64. Each of the upper and lower links 62, 64 is coupled pivotally to the side frame 56 and the center main frame 34. The set includes a first support link 66, a second support link 68, and a hydraulic cylinder 70. The first support link 66 is coupled pivotally to the side frame 56 and an axle. The second support link 68 is coupled pivotally to the center main frame 34 and the axle. The hydraulic cylinder 70 is coupled pivotally to the axle and the side frame 56, such that operation of the hydraulic cylinder 70 pivots the side section 30 and the side frame 56 thereof relative to the center main frame 34. The side conveyor 26, along with its side frame 56 and side draper belt 58, may thus be coupled to and supported by the center main frame 34.

Figure 4:
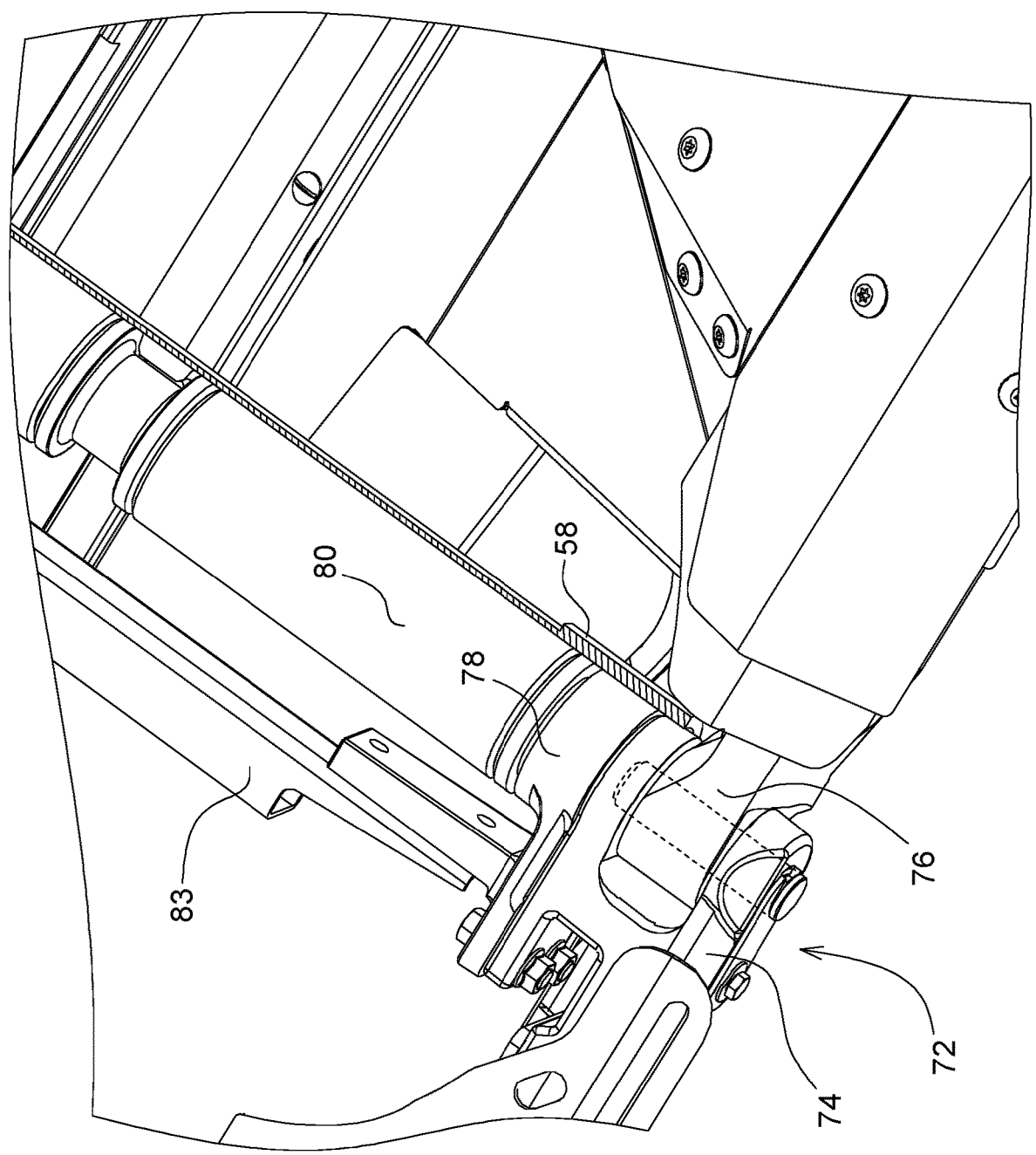
FIG. 4 is a perspective view showing a pivot point between a side frame of the side section and the center main frame of the center section.

Referring to FIGS. 2 and 4, the side conveyor 26, along with its side frame 56 and side draper belt 58, is further coupled to and supported by the center main frame 34 at a front pivot point 72. The side frame 56 is coupled to the center main frame 34 at the front pivot point 72. The pivot point 72 is configured, for example, as a hinge with a first hinge portion 74 included in the side frame 56, a second hinge portion 76 included in the center main frame 34, and an axle (shown in phantom) interconnecting the hinge portions 74, 76. The axle is positioned in apertures of two respective lugs of the first hinge portion 74 and in an aperture of the second hinge portion 76. A bushing is positioned in the aperture of the second hinge portion 76, and the axle is positioned in the bushing. A seal is positioned on either side of the bushing to establish a sealed connection with the aperture of the second hinge portion 76 and the axle. An end cap is fixed to the front lug of the first hinge portion 74 (e.g., with two fasteners screwed to the front lug) to block forward egress of the axle from the pivot point 72.

The side conveyor 26, along with its side frame 56 and side draper belt 58, is coupled to and supported by the center main frame 34 at the front pivot point 72. The proximal roller 80 is coupled to the pivot point 72. For example, a first (forward) bracket 78 of the side frame 56 is fixed (e.g., with two fasteners so as to be bolted) or otherwise coupled to the hinge portion 74, and a first (forward) end of the proximal roller 80 is rotatably coupled to the bracket 78 via a bearing positioned in the bracket 78. The bearing is positioned in a collar of the bracket 78 such that an outer race of the bearing mates with the collar, and a stub shaft of the proximal roller 80 extends into the bearing such that the stub shaft mates with an inner race of the bearing.

The opposite, second (rearward) end of the proximal roller 80 is rotatably coupled to the side frame 56. The second end of the proximal roller 80 is rotataby coupled to a second (rearward) bracket 82 via a bearing positioned in the bracket 82. The bearing is positioned in a collar of the bracket 82 such that an outer race of the bearing mates with the collar, and a stub shaft of the proximal roller 80 extends into the bearing such that the stub shaft mates with an inner race of the bearing. The first and second brackets 78, 82 are fixed (e.g., with fasteners so as to be bolted) or otherwise coupled to a bar 83 of the side frame 56.

Figure 5:
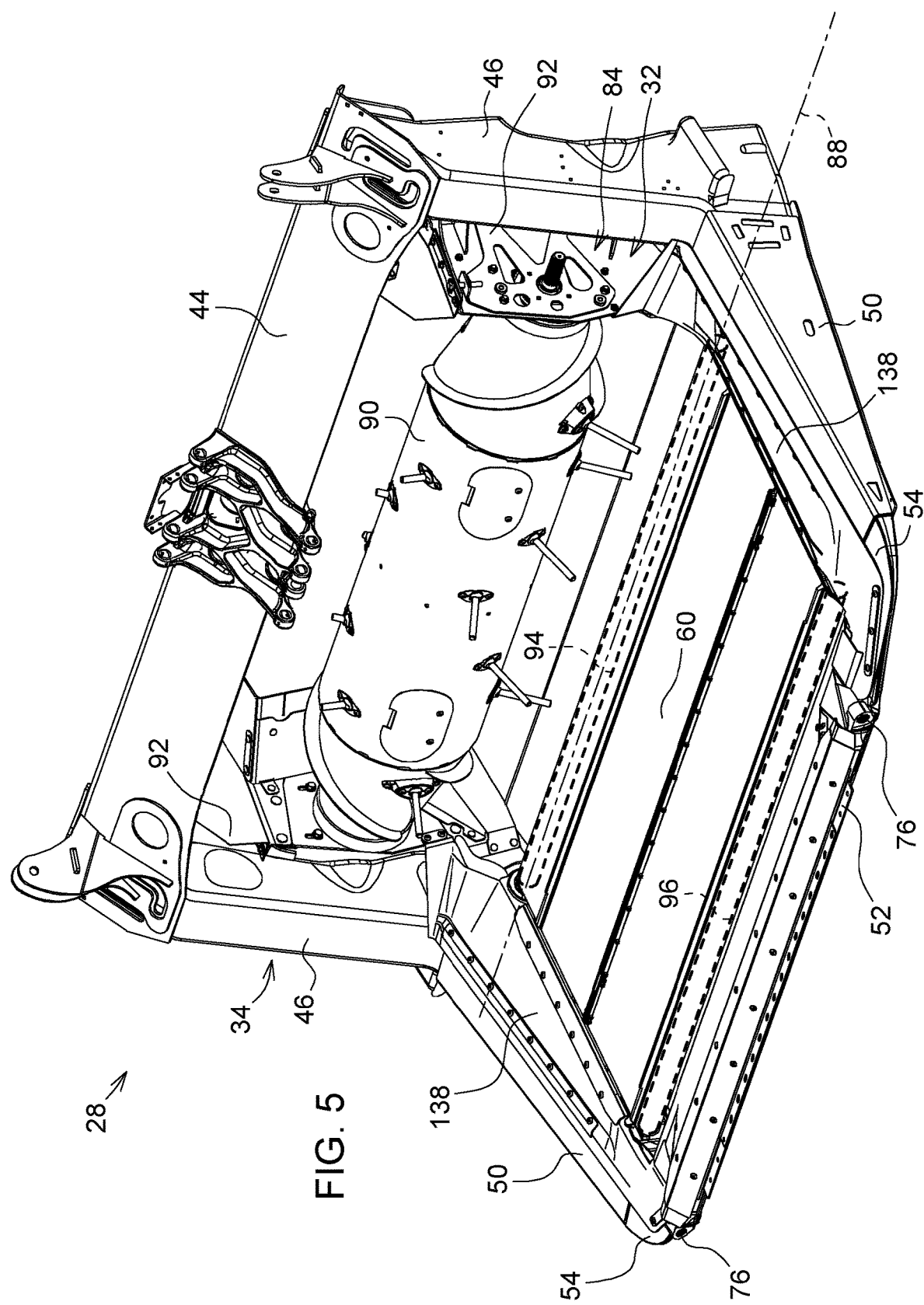
FIG. 5 is a perspective view showing the center section.

Referring to FIGS. 3 and 5, the center main frame 34 includes a first (right) and a second (left) fore-aft side member 50, a laterally-extending front member 52, and a first (right) and second (left) corner 54. The first fore-aft side member 50 is coupled fixedly (e.g., welded) to, and projects forwardly from, the first upright side member 46 of the center main frame 34. The second fore-aft side member 50 is coupled fixedly (e.g., welded) to, and projects forwardly from, the second upright side member 46 of the center main frame 34. The first corner 54 interconnects the first fore-aft side member 50 and the front member 52, and the second corner 54 interconnects the second fore-aft side member 50 and the front member 52. The cutter bar 18 is coupled to the front member 52.

Referring to FIGS. 2 and 3, the center support frame 32 includes a feed frame 84 and a center belt frame 86 (which may also be called a center tension frame or a center draper frame). The center belt frame 86 is an example of a second frame of the agricultural header 10, and is positioned laterally between the first and second fore-aft side members 50 of the center main frame 34. The feed frame 84 is positioned between the attachment frame 36 and the center belt frame 86 relative to a fore-aft dimension parallel to the direction of travel 14. The feed frame 84 is coupled fixedly to the attachment frame 36 (e.g., bolted). The center belt frame 86 is coupled pivotally to the feed frame 84 to pivot about an axis 88. A drum 90 of the header 10 is coupled rotatably to, and positioned between, first (right) and second (left) side walls 92 of the feed frame 84. The drum 90 has tines about its periphery and is driven by a motor to advance cut crop toward the intake of the feederhouse 23.

Referring to FIGS. 3 and 5-7, the center conveyor 24 is supported by the center belt frame 86. The center conveyor 24 includes a rear drive roller 94 operable in rotation by a motor, a front idler roller 96, and the center draper belt 60 entrained about the rollers 94, 96. The rear drive roller 94 and the front idler roller 96 are coupled rotatably to, and positioned between, first (right) and second (left) fore-aft side members 98 of the center belt frame 86. The fore-aft side members 98 are similar to one another (the left fore-aft side member 98 not shown). The first and second fore-aft side members 98 are coupled rotatably respectively to the first and second side walls 92 of the feed frame 84. Alternatively, the first and second fore-aft side members 98 may be coupled fixedly (e.g., bolted) to the first and second side walls 92 of the feed frame 84. The center draper belt 60 can thus be supported by the center support frame 32 and the center belt frame 86.

Figure 6:
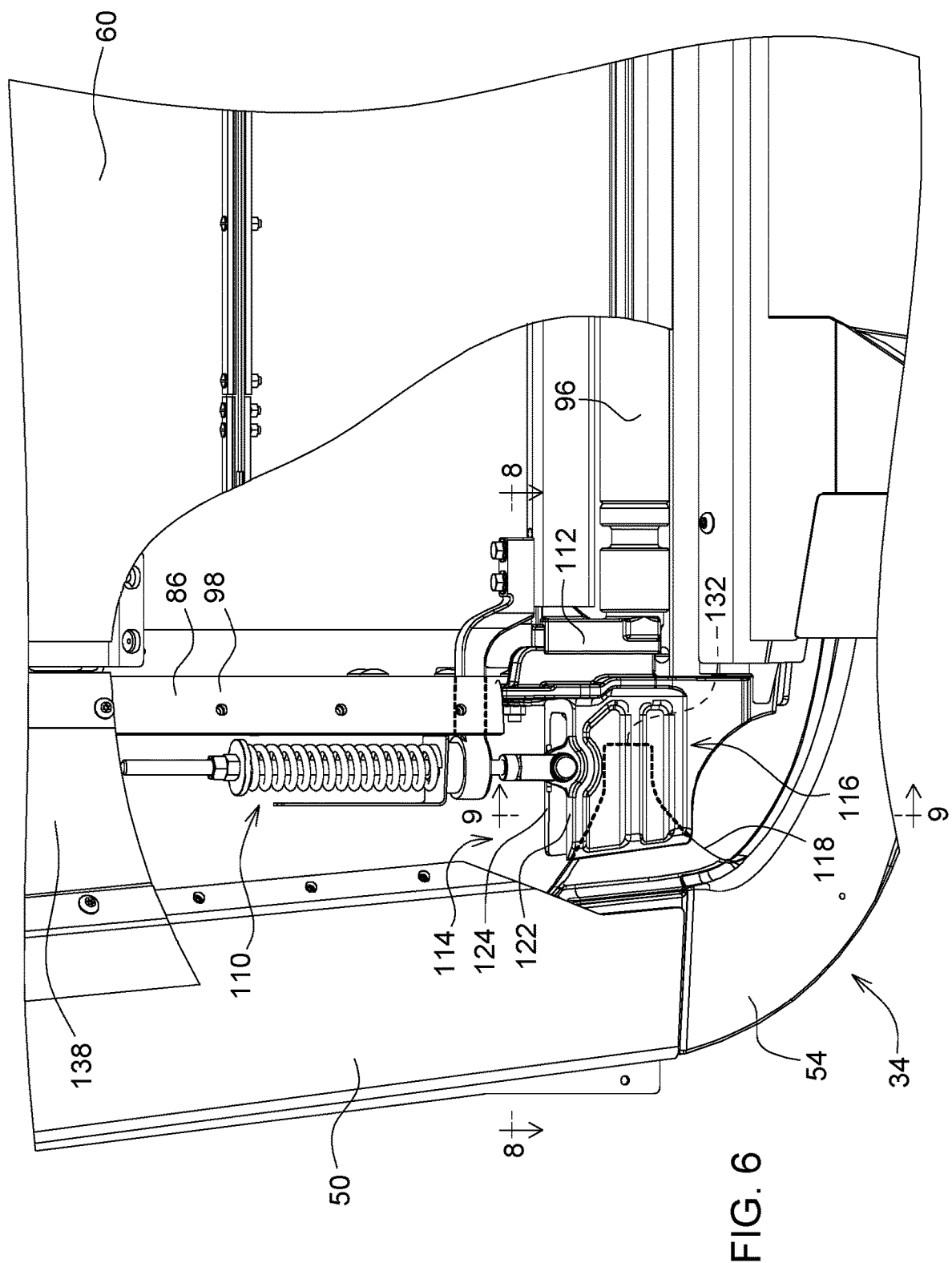
FIG. 6 is a top view, with portions broken away, showing a joint interconnecting the center main frame and a center belt frame of the center section and enabling relative fore-aft and lateral translation between those frames.
Figure 7:
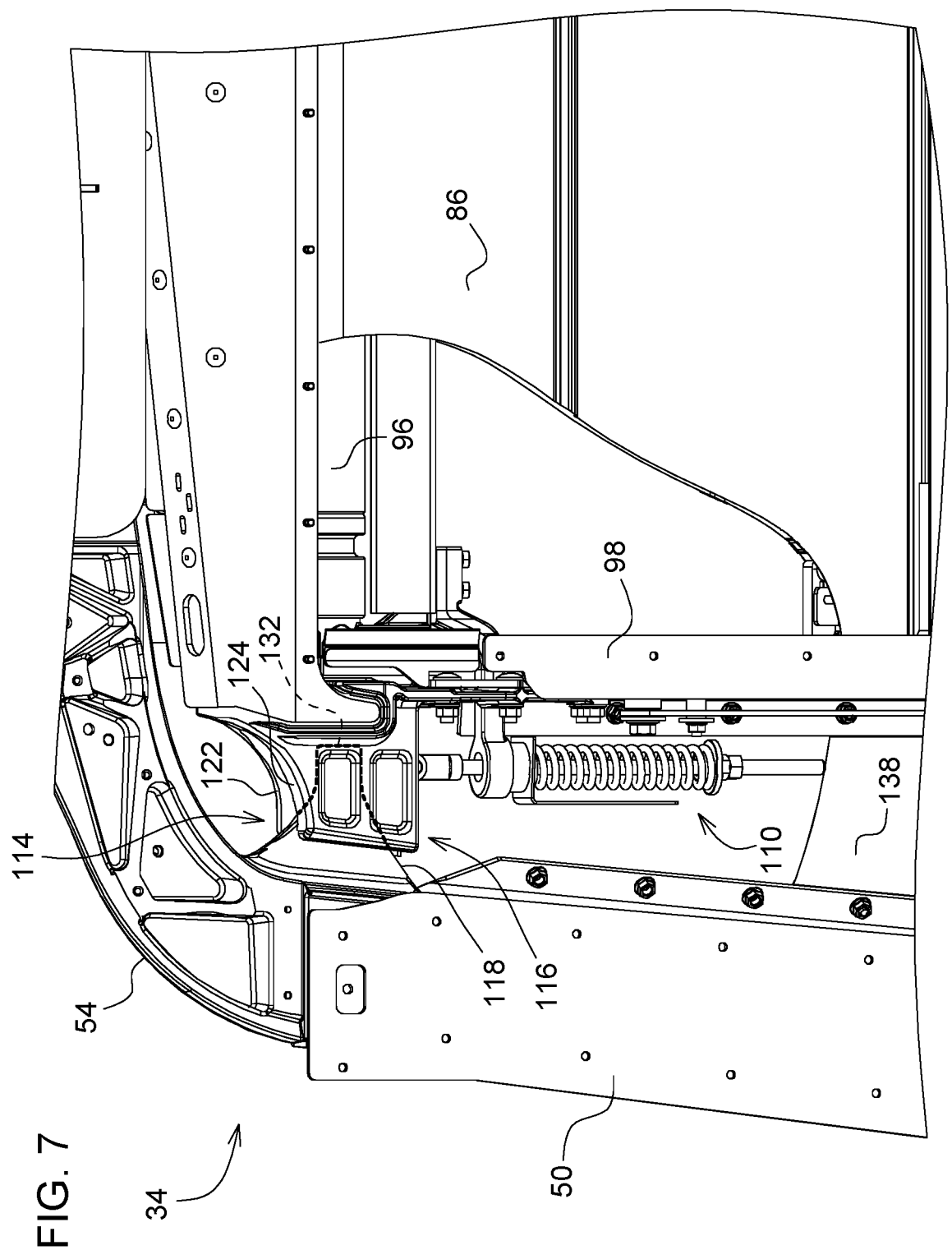
FIG. 7 is a bottom view, with portions broken away, showing the joint.

Referring to FIG. 6, the front idler roller 96 is urged forwardly by a tensioner 110 of the center conveyor 24 to tension the center draper belt 60. The front idler roller 96 is coupled to the first and second fore-aft side members 98 with a joint 112 at each end of the roller 96. The joints 112 are similar to one another, with only the first (right) joint 112 being shown.

Each joint 112 may be, for example, a tang-and-clevis joint 112. In such a case, the tang of the joint 112 may be integrated into the respective fore-aft side member 98. The clevis of the joint 112 is supported respectively on the tang of the joint 112. The tang is rather wide so as to be configured, for example, as a puck. The ends of the front idler roller 96 are coupled respectively to the devises of the joints 112. A bar of the tensioner 110 largely spans the gap between the side members 98 and has its ends also coupled respectively to the devises of the joints 112. On each side of the center belt frame 86, the tensioner 110 has a post, a spring surrounding the post, and an arm biased forwardly by the spring and extending through the side member 94 to the bar of the tensioner 110 to urge the roller 96 forwardly so as to tension the center draper belt 60.

Referring to FIGS. 6-9, the center main frame 34 is coupled to the center belt frame 86 for movement relative thereto. The center main frame 34 is coupled to the center belt frame 86 with a flexible joint 114 on either side of the center belt frame 86 such that each joint 114 is positioned laterally between the center main frame 34 and the center belt frame 86 (the joints 114 are similar to one another, with only the joint 114 on the right side being shown). Each joint 114 interconnects the frames 34, 86 and enables relative fore-aft and lateral translation between the frames 34, 86. Each cylinder 48 is coupled to the attachment frame 36 and the center main frame 34 to cause relative fore-aft and lateral translation between the center main frame 34 and the center belt frame 86 enabled by each joint 114.

The first fore-aft side member 50 of the center main frame 34 is coupled to the first fore-aft side member 98 of the center belt frame 86 with a first (right) joint 114 such that the first joint 114 is coupled to, and positioned laterally between, the first fore-aft side member 50 of the center main frame 34 and the first fore-aft side member 98 of the center belt frame 86. The second fore-aft side member 50 of the center main frame 34 is coupled to the second fore-aft side member 98 of the center belt frame 86 with a second (left) joint 114 (not shown) such that the second joint 114 is coupled to, and positioned laterally between, the second fore-aft side member 50 of the center main frame 34 and the second fore-aft side member 98 of the center belt frame 86.

Each of the joints 114 may be a sliding joint. For example, each joint 114 comprises a clevis 116 and a tang 118 positioned in the clevis 116. The clevis 116 of the first joint 114 is coupled to the first fore-aft side member 50 of the center main frame 34 or the first fore-aft side member 98 of the center belt frame 86, and the tang 118 of the first joint 114 is coupled to the other of the first fore-aft side member 50 of the center main frame 34 or the first fore-aft side member 98 of the center belt frame 86. The clevis 116 of the second joint 114 is coupled to the second fore-aft side member 50 of the center main frame 34 or the second fore-aft side member 98 of the center belt frame 86, and the tang 118 of the second joint 114 is coupled to the other of the second fore-aft side member 50 of the center main frame 34 or the second fore-aft side member 98 of the center belt frame 86. In the illustrated example, the devises 116 of the first and second joints 114 are coupled respectively to the first and second fore-aft side members 98 of the center belt frame 86, and the tangs 118 of the first and second joints 114 are coupled respectively to the first and second fore-aft side members 50 of the center main frame 34.

Referring to FIGS. 8-12, with respect to each joint 114, the clevis 116 comprises an interior region 120 into which the tang 118 extends for relative fore-aft and lateral translation between the clevis 116 and the tang 118. The clevis 116 comprises an upper lug 122 and a lower lug 124, and the interior region 120 is defined between the upper and lower lugs 122, 124. The upper lug 122 comprises a convex surface 126 facing the interior region 120 to guide relative fore-aft and lateral translation between the clevis 116 and the tang 118. The lower lug 124 comprises a ramp 128 facing the interior region 120 to guide relative fore-aft and lateral translation between the clevis 116 and the tang 118. The clevis 116 comprises a laterally inner support wall 130 from which the upper and lower lugs 122, 124 extend laterally relative to the direction of travel 14, and the tang 118 comprises a distal, laterally innermost end 132 spaced apart from the support wall 130.

The tang 118 projects laterally inwardly from the center main frame 34. The width of the tang 118 decreases as the tang 118 extends from a proximal, laterally outermost end 137 to the distal, laterally innermost end 132, such that the proximal, laterally outermost end 137 is wider than the distal, laterally innermost end 132. As such, it may be said that the tang 118 is configured as a puck. The proximal, laterally outermost end 137 is coupled to the center main frame 34. The laterally outermost end 137 is, for example, integrated with the fore-aft side member 50 and the corner 54.

The interior region 120 is larger than a thickness 136 of the tang 118, allowing relative vertical movement between the clevis 116 and the tang 118 and thus between the center main frame 34 and the center belt frame 86. The thickness 136 of the tang 118 is defined between an upper surface of the tang 118 and a lower surface of the tang 118. The interior region 120 has a dimension 134 parallel to the thickness 136 of the tang 118 and normal to the upper and lower surfaces of the tang 118. That dimension 134 is larger than the thickness 136 of the tang 118.

Figure 8:
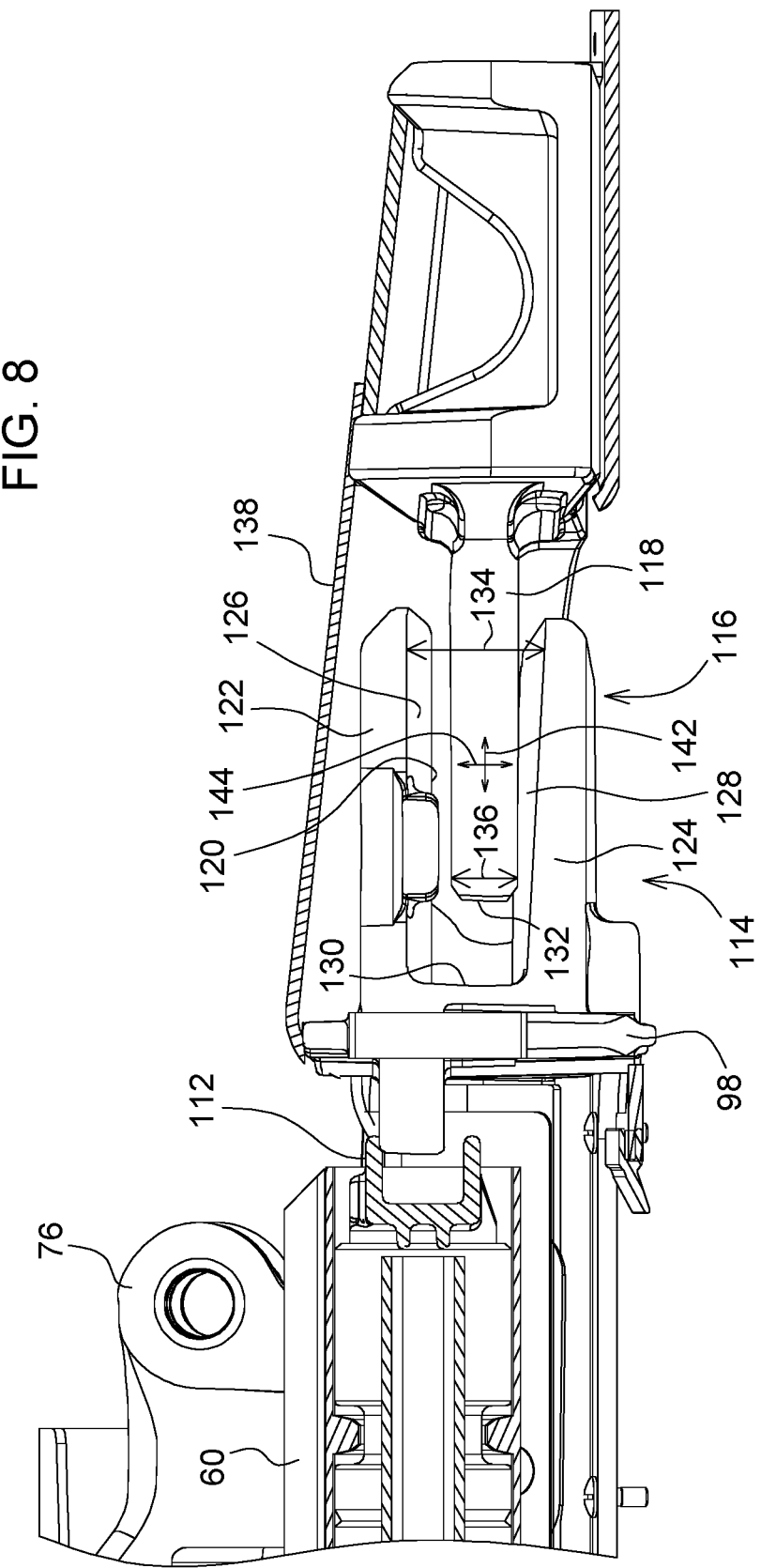
FIG. 8 is a sectional view, taken along lines of 8-8 of FIG. 6, showing the joint.
Figure 9:
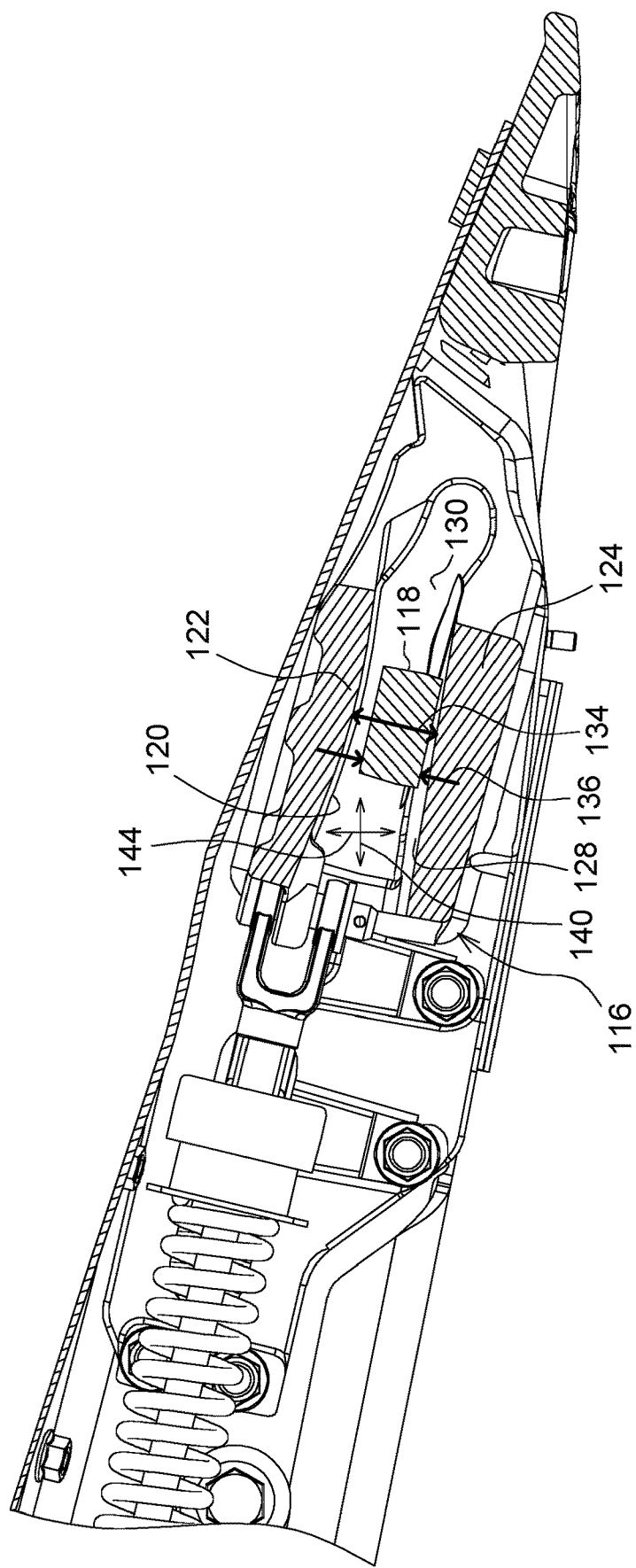
FIG. 9 is a sectional view, taken along lines 9-9 of FIG. 6, showing the joint.
Figure 12:
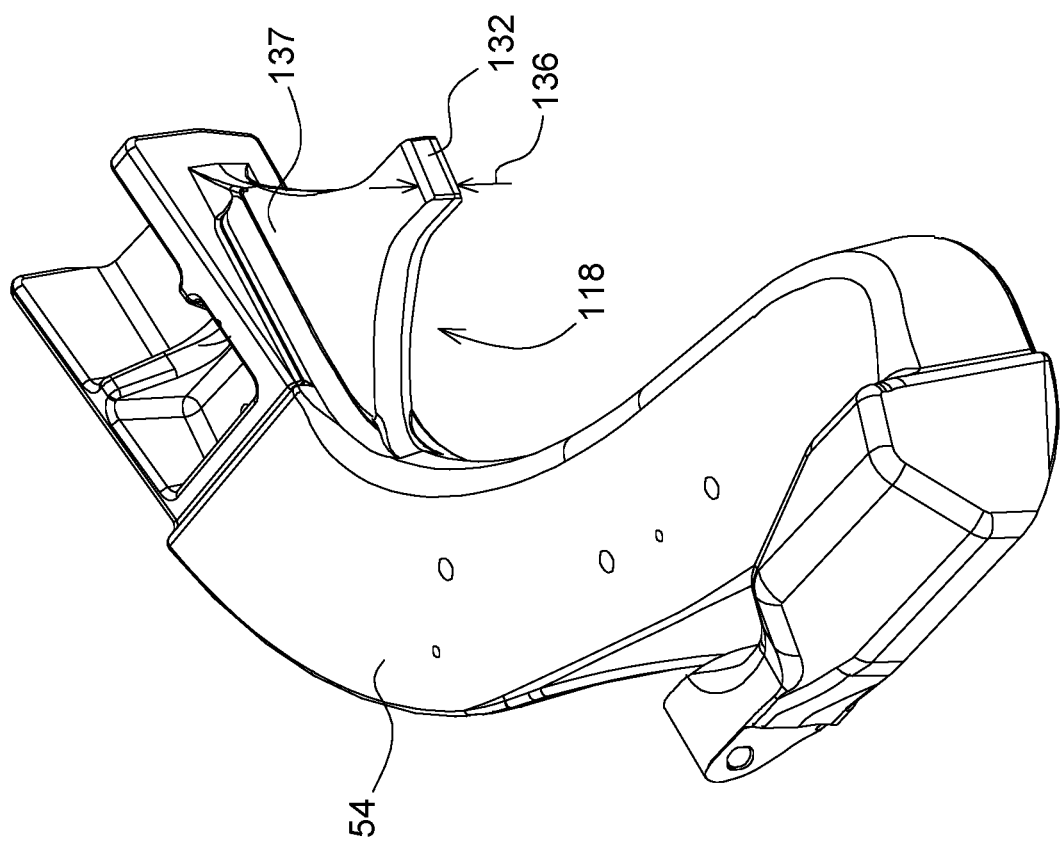
FIG. 12 is a perspective view showing a tang of the joint integrated with a component of the center main frame.

The clevis 116 of the joint 114, and the tang of the joint 112 may be integrated into a single piece (e.g., casting) (FIG. 8). The single piece includes an eye extending from the upper lug 122 of the clevis 116 of the joint 114. The post of the respective tensioner 110 is coupled to the eye by a pin-and-clevis joint (FIG. 9). The single piece includes an extension portion included in the fore-aft side member 98 of the center belt frame 86 and including an aperture through which the arm of the tensioner 110 extends. In other embodiments, the single piece may be constructed as multiple pieces.

Referring back to FIGS. 5 and 8, the header 10 may include an inter-frame first (right) and second (left) flexible seal 138. Each inter-frame flexible seal 138 is coupled to the center main frame 34 and the center belt frame 86. The first seal 138 spans a first gap between the first fore-aft side member 50 of the center main frame 34 and the first fore-aft side member 98 of the center belt frame 86. The second seal 138 spans a second gap between the second fore-aft side member 50 of the center main frame 34 and the second fore-aft side member 98 of the center belt frame 86. The first seal 138 underlies the side draper belt 58 of the first side conveyor 26 to receive cut crop that falls from that side draper belt 58 and is arranged relative to the center draper belt 60 to guide fallen crop toward the center draper belt 60. The first joint 114 underlies the first seal 138 in the first gap. The second seal 138 underlies the side draper belt 58 of the second side conveyor 26 to receive cut crop that falls from that side draper belt 58 and is arranged relative to the center draper belt 60 to guide fallen crop toward the center draper belt 60. The second joint 114 underlies the second seal 138 in the second gap. Each seal 138 is configured to flex to accommodate movement of the center main frame 34 relative to the center belt frame 86, and may be made, for example, of an elastomeric material (e.g., butyl rubber).

Referring to FIGS. 8 and 9, relative movement between the center main frame 34 and the center belt frame 86 can occur in response to terrain-following of the header 10 as modified by cylinders 48. The joints 114 enable relative fore-aft, lateral, and vertical translation between the center main frame 34 and the center belt frame 86. The upper lugs 122 of the devises 116 ordinarily rest respectively on the tangs 118. The lower lugs 124 may contact respectively the tangs 118 in response to an acute change in terrain due, for example, to a berm, stone, or other terrain feature. Twisting of the center main frame 34 (lateral movement about a fore-aft axis) may cause the tang 118 on one side of the center belt frame 86 to contact the upper lug 122 on that side and the tang 118 on the other side to contact the lower lug 124 on the other side. The roll axes of the center main frame 34 and the center belt frame 86 (lateral axes about which the frames 34 and 86 can pivot fore and aft) are, for example, different from one another, which may further result in relative translation between the frames 34, 86. For example, there can be a relative rocking motion between the frames 34, 86 about the roll axes. The lower surfaces 126 of the upper lugs 122 are convex for smooth contact between the upper lugs 122 and the tangs 118 during such rocking motion. The ramps 128 also provide for smooth contact with the tangs 118.

The joints 114 may be configured in a variety of other ways, with associated structure reconfigured accordingly. In an embodiment, each joint may include a pin and a slot into which the pin projects and is positioned to the side of the center belt frame. For example, the pin may extend laterally outwardly from the center belt frame into the slot formed in the respective fore-aft side member of the center main frame. In another example, the pin may extend laterally inwardly from the center main frame into a slot formed in the center belt frame. As such, in each example, the joint interconnects the center main frame and the center belt frame and enables relative fore-aft and lateral translation between the center main frame and the center belt frame.

In another embodiment, each joint is configured as another type of pin-and-slot joint but is positioned at the front of the center belt frame on a respective side of a fore-aft centerline of the center belt frame. For example, the pin is bowed and coupled at each end of the pin to respective points at the front of the center belt frame such that an intermediate portion of the pin between the ends of the pin extends through the slot, and the slot is included in a plate coupled to the front member of the center main frame with the slot angled linearly upwardly and forwardly. In another example, the pin is coupled to the front member of the center main frame, and the slot is included in a structure coupled to the front of the center belt frame. As such, in each example, the joint interconnects the center main frame and the center belt frame and enables relative fore-aft and lateral translation between the center main frame and the center belt frame.

In another embodiment, each joint is configured as a hinged linkage. For example, each joint includes a first link and a second link. The first link is pivotally coupled to the center main frame at a pivot joint. The second link is pivotally coupled to the center belt frame at another pivot joint. The first and second links are pivotally coupled to one another at another pivot joint. As such, the joint interconnects the center main frame and the center belt frame and enables relative fore-aft and lateral translation between the center main frame and the center belt frame.

It is to be understood that the hatching in the drawings is general in nature, rather than material-specific.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. An agricultural header for use with an agricultural harvester, the agricultural header configured to cut crop when the agricultural harvester moves in a direction of travel, the agricultural header comprising:
a first frame,
a side draper belt supported by the first frame and positioned to receive cut crop and advance cut crop laterally relative to the direction of travel,
a second frame,
a center draper belt supported by the second frame and positioned in register with the side draper belt to receive cut crop laterally therefrom and advance cut crop rearwardly toward the agricultural harvester opposite to the direction of travel, and
a joint interconnecting the first frame and the second frame and enabling relative fore-aft and lateral translation between the first frame and the second frame, the joint being a sliding joint having a clevis with an interior region into which a tang extends for relative fore-aft and lateral translation, the clevis having an upper lug and a lower lug defining the interior region, the upper lug having a convex surface facing the interior region to guide relative fore-aft and lateral translation between the clevis and the tang.

2. The agricultural header of claim 1, wherein the lower lug comprises a ramp facing the interior region to guide relative fore-aft and lateral translation between the clevis and the tang.

3. The agricultural header of claim 1, wherein the clevis comprises a laterally inner support wall from which the upper and lower lugs extend laterally relative to the direction of travel, and the tang comprises a laterally innermost end spaced apart from the support wall.

4. The agricultural header of claim 1, wherein the interior region is larger than a thickness of the tang.

5. The agricultural header of claim 1, wherein the first frame comprises a fore-aft side member, the second frame comprises a fore-aft side member, and the joint is coupled to, and positioned laterally between, the fore-aft side members of the first and second frames.

6. The agricultural header of claim 5, wherein the clevis is coupled to the fore-aft side member of the first frame or the fore-aft side member of the second frame, and the tang is coupled to the other of the fore-aft side member of the first frame or the fore-aft side member of the second frame.

7. The agricultural header of claim 1, comprising a second joint, wherein the first frame comprises a first fore-aft side member and a second fore-aft side member, the second frame is positioned laterally between the first and second fore-aft side members of the first frame and comprises a first fore-aft side member and a second fore-aft side member, the joint is a first joint coupled to the first fore-aft side members of the first and second frames, and the second joint is coupled to the second fore-aft side members of the first and second frames.

8. The agricultural header of claim 7, wherein the second joint comprises a clevis and a tang positioned in the clevis of the second joint, the clevis of the first joint is coupled to the first fore-aft side member of the first frame or the first fore-aft side member of the second frame, the tang of the first joint is coupled to the other of the first fore-aft side member of the first frame or the first fore-aft side member of the second frame, the clevis of the second joint is coupled to the second fore-aft side member of the first frame or the second fore-aft side member of the second frame, and the tang of the second joint is coupled to the other of the second fore-aft side member of the first frame or the second fore-aft side member of the second frame.

9. The agricultural header of claim 1, comprising a side frame coupled to the first frame, wherein the side draper belt is supported by the side frame, and the joint is positioned laterally between the first frame and the second frame.

10. The agricultural header of claim 9, comprising an attachment frame to be coupled to a feederhouse of the agricultural harvester and a hydraulic cylinder coupled to the attachment frame and the first frame to cause relative fore-aft and lateral translation between the first frame and the second frame enabled by the joint.

11. An agricultural header for use with an agricultural harvester, the agricultural header configured to cut crop when the agricultural harvester moves in a direction of travel, the agricultural header comprising:
a side frame,
a side draper belt supported by the side frame and positioned to receive crop cut by the agricultural header and advance cut crop laterally relative to the direction of travel,
a center main frame to which the side frame is coupled for movement relative to the center main frame,
a center belt frame,
a center draper belt supported by the center belt frame and positioned in register with the side draper belt to receive cut crop laterally therefrom and advance cut crop rearwardly toward the agricultural harvester opposite to the direction of travel, and
a joint coupled to the center main frame and the center belt frame enabling relative fore-aft and lateral translation between the center main frame and the center belt frame, the joint being a sliding joint having a clevis with an interior region into which a tang extends for relative fore-aft and lateral translation, the clevis having an upper lug and a lower lug defining the interior region, the upper lug having a convex surface facing the interior region to guide relative fore-aft and lateral translation between the clevis and the tang.

* * * * *